UNITED STATES PATENT OFFICE.

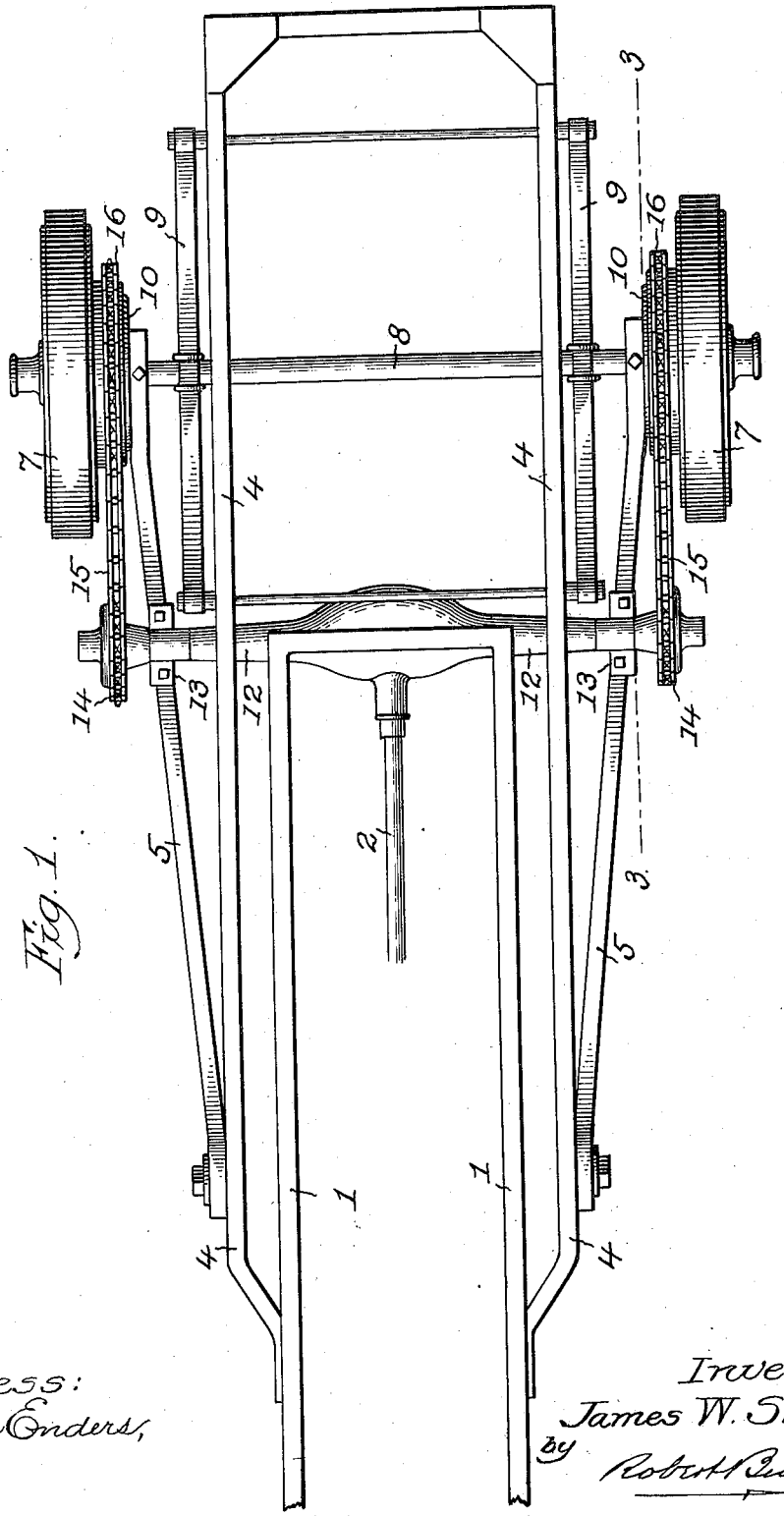

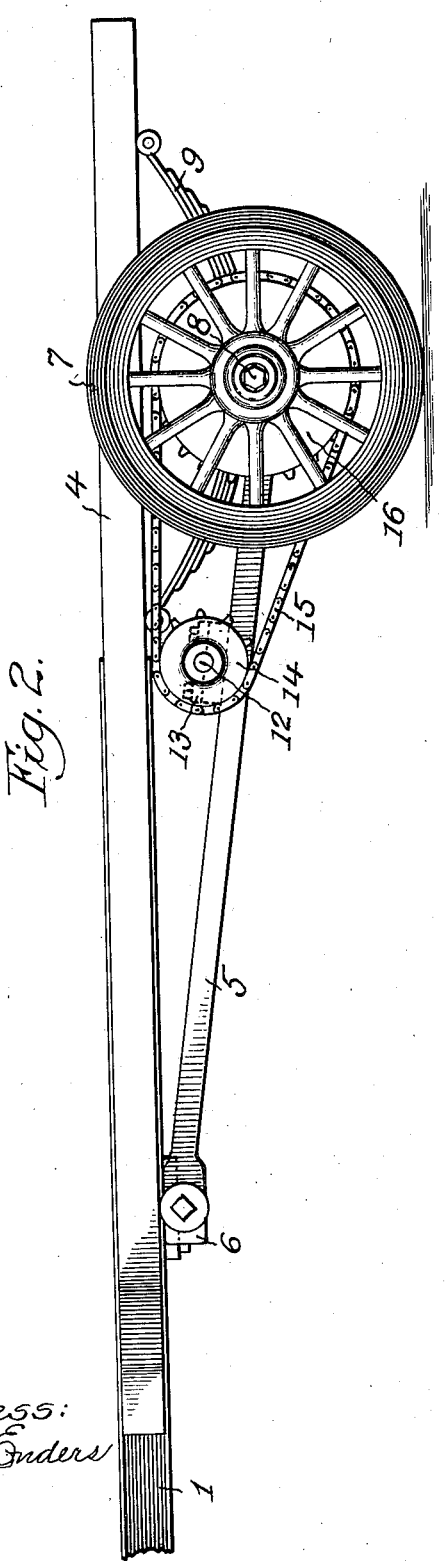
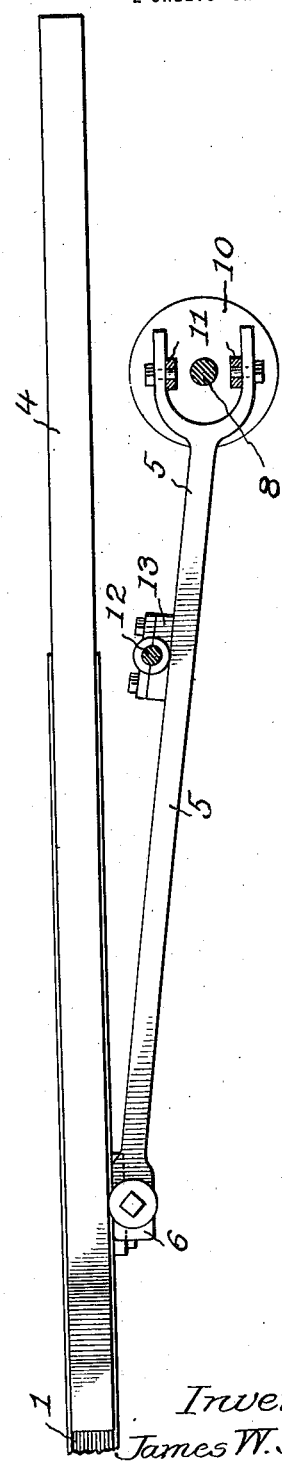

JAMES W. SHAW, OF CHICAGO, ILLINOIS.

MOTOR-TRUCK ATTACHMENT.

1,269,009.  Specification of Letters Patent.  Patented June 11, 1918.

Application filed October 11, 1916, Serial No. 124,974. Renewed November 12, 1917. Serial No. 201,724.

*To all whom it may concern:*

Be it known that I, JAMES W. SHAW, a citizen of the United States of America, and a resident of Chicago, in the county of Cook, State of Illinois, have invented certain new and useful Improvements in Motor-Truck Attachments, of which the following is a specification.

This invention relates to that type of attachments by means of which an ordinary passenger carrying automobile is converted into a freight carrying truck.

And the present improvement has for its object to provide a structural formation and association of parts whereby such change and reorganization is effected in a substantial and economical manner, and with which a very efficient arrangement of the driving mechanism of the modified structure is attained, all as will hereinafter more fully appear.

In the accompanying drawings:

Figure 1, is a plan view of the supporting frame or chassis of a reconstructed motor vehicle, embodying the present invention.

Fig. 2, is a side elevation of the same.

Fig. 3, is a longitudinal section on line 3—3, Fig. 1.

Similar reference numerals indicate like parts in the several views.

Referring to the drawings, 1 designates the rear portion of the comparatively short supporting frame or chassis of a passenger carrying automobile, and 2 the usual main or power shaft of the motor thereof.

4 designates an auxiliary frame fixedly secured by rivets or other usual fastening means at the rear of the frame 1 aforesaid, to constitute a fixed rearward extension thereof. Said frame 4 is preferably of the rectangular form shown.

5 designates a vibratory frame arranged beneath the frames 1 and 4 above described, and pivotally attached at its forward end to a pivot bracket 6 carried by said frames. At its rear end the vibratory frame 5 is connected to the driving axle of the reconstructed vehicle chassis and preferably in the manner now to be described.

7 designates the rear driving wheels of the reconstructed vehicle chassis mounted on the usual non-revoluble axle 8, which in turn is resiliently connected to the rear portion of the auxiliary frame 4 by springs 9 and other usual connecting means. In the construction shown, the fixed brake heads 10 of the braking mechanisms of the rear wheels 7 aforesaid, are formed as fixed and preferably integral portions of the axle 8, and the rear ends of the auxiliary frame 4 are of a forked formation and bolted to lateral bracket lugs 11 on said brake heads, and preferably in a longitudinally adjustable manner in order to provide means for adjusting and tensioning the drive chains hereinafter described.

12 designates a transversely arranged driving shaft, of the ordinary differential type, and having operative connection at its middle with the power shaft 2 aforesaid, while its respective ends are provided with sprocket pinions 14, which in turn have chain connections 15 with sprocket wheels 16 fixedly associated with the rear driving wheels 7 above described. And a material part of the present invention comprises the mounting of said intermediate differential driving shaft 12 in journal boxes 13 carried by the vibratory frame 5 aforesaid. With the described arrangement the axis of the differential driving shaft 12, and that of the driving wheels 7 are maintained in fixed relation in actual use, and the liability of the chains 15 becoming detached from their sprocket pinions and gears is prevented in a very effective manner.

Having thus fully described my said invention, what I claim as new and desire to secure by Letters Patent, is:—

1. In a motor truck attachment of the type herein described, the combination of a forward frame and a rearward or extension frame fixedly connected together, an axle resiliently associated with the rearward frame aforesaid, driving wheels mounted on said axle, a vibratory frame pivotally connected at its forward end to one of said frames and rigidly connected at its rearward ends to the axle aforesaid, a differential drive shaft mounted on said vibratory frame and having chain and sprocket connections with the driving wheels aforesaid, and operative connection with a motor shaft, substantially as set forth.

2. In a motor truck attachment of the type described, the combination of a forward frame and a rearward or extension frame fixedly connected together, an axle resiliently associated with the rearward frame aforesaid and carrying the fixed heads of brake mechanisms, driving wheels mounted on said axle, a vibratory frame pivotally connected at its forward end to one of said frames and rigidly connected at its rear ends to the fixed heads of the brake mechanisms of the axle aforesaid, a differential drive shaft mounted on said vibratory frame and having chain and sprocket connections with the driving wheels aforesaid, and operative connection with a motor shaft, substantially as set forth.

Signed at Chicago, Illinois, this 9th day of October, 1916.

JAMES W. SHAW.